US010533324B2

(12) United States Patent
Baltz, Jr. et al.

(10) Patent No.: US 10,533,324 B2
(45) Date of Patent: Jan. 14, 2020

(54) BELOW TOP OF WALL VENTILATION SCREED DEVICE AND ASSEMBLY

(71) Applicants: Gary George Baltz, Jr., Mountain Brook, AL (US); Frederic C. Mayer, Jr., Hoover, AL (US)

(72) Inventors: Gary George Baltz, Jr., Mountain Brook, AL (US); Frederic C. Mayer, Jr., Hoover, AL (US)

(73) Assignee: ALABAMA METAL INDUSTRIES CORPORATION

( * ) Notice: Subject to any disclaimer, the term of this patent is extended or adjusted under 35 U.S.C. 154(b) by 0 days.

(21) Appl. No.: 16/194,775

(22) Filed: Nov. 19, 2018

(65) Prior Publication Data

US 2019/0194954 A1 Jun. 27, 2019

Related U.S. Application Data

(60) Provisional application No. 62/592,612, filed on Nov. 30, 2017.

(51) Int. Cl.
*E04F 19/04* (2006.01)
*E04B 1/70* (2006.01)

(52) U.S. Cl.
CPC ............ *E04F 19/04* (2013.01); *E04B 1/7038* (2013.01); *E04B 1/7076* (2013.01); *E04F 2019/0445* (2013.01)

(58) Field of Classification Search
CPC ...... E04B 1/7038; E04B 1/7076; E04F 19/04; E04F 2019/0445

(Continued)

(56) References Cited

U.S. PATENT DOCUMENTS 2,645,824 A 7/1953 Titsworth
2,664,057 A * 12/1953 Ausland .............. E04D 13/1415 52/61

(Continued)

FOREIGN PATENT DOCUMENTS

AU 2008202082 A1 11/2008
CA 2777166 A1 11/2012

(Continued)

OTHER PUBLICATIONS

From application 15446732—cited as "Prior Art Weep Screed from Google Search 1 page: dated 2004".

(Continued)

*Primary Examiner* — Adriana Figueroa
(74) *Attorney, Agent, or Firm* — Jennifer Meredith, Esq.; Lippes Mathias Wexler Friedman, LLP

(57) ABSTRACT

A ventilation screed having an upper attachment flange having a top portion and a bottom portion and at least one opening in the top portion; a drip edge protruding from the bottom portion of the upper attachment flange; a drainage cavity protrusion protruding from the bottom portion of the upper attachment flange above the drip edge, wherein the drainage cavity has an L-shaped drainage trough portion having at least one drainage opening in a bottom portion, an upper ground portion in communication with the L-shaped drainage trough portion and a drainage cavity shroud in communication with the upper ground portion, wherein the drainage cavity shroud extends past the drip edge.

21 Claims, 18 Drawing Sheets

100

6
2
4
20
26
14
20
12
22
18
21
8
16
10
24

(58) Field of Classification Search
USPC ........................................................ 52/58, 61
See application file for complete search history.

(56) References Cited

U.S. PATENT DOCUMENTS 2,905,072 A * 9/1959 Oswald ................. E04B 1/7076
454/276
3,206,806 A 9/1965 Powell
3,343,323 A 9/1967 Mayfield
3,568,391 A 3/1971 Conway
4,924,647 A 5/1990 Drucker
5,630,297 A * 5/1997 Rutherford ............... E04B 1/66
52/371
5,694,723 A 12/1997 Parker
5,809,731 A 9/1998 Reiss
5,836,135 A 11/1998 Hagan
6,018,924 A 2/2000 Tamlyn
6,119,429 A 9/2000 Bifano
6,293,064 B1 9/2001 Larson
6,298,609 B1 * 10/2001 Bifano .................... E04B 1/765
52/101
6,308,470 B1 10/2001 Durkovic
6,385,932 B1 5/2002 Melchiori
6,410,118 B1 6/2002 Reicherts
6,470,638 B1 10/2002 Larson
6,792,725 B1 9/2004 Rutherford
6,823,633 B2 11/2004 Ryan
6,964,136 B2 * 11/2005 Collins ..................... E04B 1/70
52/204.2
7,219,477 B2 5/2007 Leffler
7,546,719 B1 6/2009 Guevara
7,584,587 B2 9/2009 Ouellette
7,621,079 B2 11/2009 Kyozaburo
7,634,883 B1 * 12/2009 Larson .................... E04F 13/06
52/393
7,673,421 B2 * 3/2010 Pilz ........................ E04F 13/06
52/302.6
7,743,575 B2 6/2010 Ito
7,810,291 B2 10/2010 McPherson
8,281,530 B2 10/2012 Chaussee
8,578,660 B2 11/2013 Nolan
8,584,416 B2 * 11/2013 Chenier .................. E04F 13/06
52/393
8,596,019 B2 12/2013 Aitken
8,646,222 B2 2/2014 Carbonaro
D700,717 S 3/2014 Campacci
8,726,594 B2 5/2014 Salazar
8,813,443 B2 8/2014 Goldberg
8,919,062 B1 12/2014 Viness
8,943,761 B2 2/2015 Carbonaro
9,140,008 B2 9/2015 Fischer
9,366,040 B2 6/2016 Singh
10,024,063 B2 * 7/2018 Friel ....................... E04B 1/765
10,060,126 B2 * 8/2018 Collins ................... E04F 19/02
10,196,812 B1 * 2/2019 Duffy ...................... E04F 21/00
2003/0126810 A1 7/2003 Brunson
2003/0177736 A1 9/2003 Gatherum
2006/0123723 A1 6/2006 Weir
2006/0277854 A1 12/2006 Egan
2007/0044402 A1 3/2007 Hess
2007/0062137 A1 * 3/2007 Maylon ................... E04F 13/06
52/367
2008/0104918 A1 * 5/2008 Gleeson .................... E04B 1/74
52/489.1
2009/0183453 A1 7/2009 Koessler et al.
2010/0101168 A1 4/2010 Hohmann
2010/0287861 A1 11/2010 Goldberg
2011/0252731 A1 10/2011 Boyer
2011/0302863 A1 12/2011 Sourlis
2012/0066984 A1 3/2012 Thompson
2012/0066986 A1 3/2012 Thompson
2013/0125487 A1 5/2013 Power
2015/0013257 A1 1/2015 Power
2015/0027074 A1 1/2015 Preston
2017/0030072 A1 2/2017 Corson
2017/0226732 A1 8/2017 Collins
2017/0254091 A1 9/2017 Friel

FOREIGN PATENT DOCUMENTS

JP 2657037 B2 9/1997
JP 10037321 2/1998
JP 11131611 A 5/1999
JP 2008196248 8/2008
JP 4490340 B2 6/2010
JP 5968618 8/2010
JP 2011169094 A 9/2011
JP 5002275 8/2012
JP 2012202177 10/2012
JP 2014218814 11/2014
WO WO2016040273 3/2016

OTHER PUBLICATIONS

From application 15446732—cited as "Images of J-Bead believed to have been known in the art prior to Mar. 1, 2016".

* cited by examiner

BELOW TOP OF WALL VENTILATION SCREED DEVICE AND ASSEMBLY

TECHNICAL FIELD

The present disclosure generally relates to a device configured to allow ventilation and the escape of water or other moisture in the form of vapor at locations below the top of a building or structure wall. Such conditions typically occur but are not limited to, locations above windows and doors and the juncture of dissimilar construction materials, and the bases of walls or transitions from floor to floor on multistory buildings.

BACKGROUND

For purposes of the foregoing specification and appended claims the term "vapor," whether or not accompanied by any words such as "moisture," "water" or other words describing similar matter or states of matter, refers to all forms of liquid and gases not limited to water, water vapor, moisture as created by any means.

This invention addresses the condition that walls hold vapor and moisture and their inability to allow vapor and moisture to escape so the wall can dry is a major factor in the premature deterioration of a structure. Building science, construction practices and emerging energy codes have changed greatly over recent decades resulting in significantly better insulated walls. Consequently these newer wall designs allow less means for vapor and moisture to escape and less air flow. This has led to increasingly premature deterioration of walls of buildings and structures.

Established wall designs and construction are intended to keep water out of walls but not necessarily to allow them to breathe. Building wraps traditionally prevent water intrusion but do not let moisture out. A better wall design must allow for moisture and vapor to move through a predetermined path depending upon when the inside and outside temperatures have the sufficient temperature difference to create and hold excess moisture.

Further, air pressure differential from inside and outside the wall due to temperature and or wind can force moisture into the wall through the wall's surface, in addition to preventing vapor and moisture from escaping. This prevents condensation from escaping and inhibits drying. Further, when cold air contacts hot air, or vice versa, condensation occurs and moisture is formed inside the walls of buildings and structures.

As a result, moisture and water accumulates without a means to escape causing the sheathing of walls to absorb moisture. Plywood, cement board, or OSB (Oriented Strand Board), which is more prone to absorb moisture, can begin to mold, deteriorate, rot and hold more water. As the sheathing fails the weight of the finish material will begin to crack. This allows more moisture accumulation in the walls. Ultimately the finish material can fall away from the building or structure. Areas receiving 20-inches or more of rain a year are the most susceptible to this type of deterioration.

Current building science, and construction materials and practices do not provide a clear and effective means for vapor to escape from different conditions within the walls of a building or structure. "J" bead and casing beads have been used at the base of walls as a possible means for vapor to escape. A misconception is that punched drainage holes in the ground allow moisture to escape. During installation of a stucco finish these holes become blocked and the only escape for vapor is through the stucco membrane or other cladding material which promotes accelerated deterioration. This method only works in areas where no or negligible rainfall is present.

Weep screeds have been used with stucco cladding and currently are the only the vapor escape method approved by building codes and standards. Again, the weep screed is ineffective because the path for vapor to escape a weep screed is the minute space created between the finish and the upper surface of the screed as the finish cures and shrinks.

Another problem area occurs at through wall penetrations such as above windows and doors. Casing beads with drip holes as disclosed above do not provide a reliable vehicle for vapor or water escape. Further, casing beads plus a drip edges create additional problems in their attempt at solving the vapor and water intrusion/vapor escape problems. The cutting trimming of drip edges to block the assembly from water intrusion is as much a problem as providing an escape for vapor.

U.S. Pat. No. 8,584,416 is a movement control screed which provides for the movement of adjacent upper and lower masonry coatings, allowing for some drainage of water only from the upper stucco panel. The patent teaches that the device is intended to keep water out by providing for movement at the floor plates. It does not teach or claim to allow the escape of vapor or for the wall to dry. There is no provision for incorporating a defined drainage plane, that is rainscreen. Further, this device was intended for wood framed and sheathed construction with a stucco finish above and stucco over masonry or block below. The patent does not cover a three coat stucco finish above and below or stucco above and stone below.

U.S. Pat. No. 7,673,421 is a device to allow for water drainage only at floor joints. The patent teaches that the device is intended to keep water out by providing for movement at the floor plates and not to allow for vapor to escape or for the wall to dry. There is no provision for incorporating a defined drainage plane, that is a rainscreen. Further, this device was intended for wood framed and sheathed construction with a stucco finish above and stucco over masonry or block below. The patent does not cover a three coat stucco finish above and below or stucco above and stone below.

U.S. Pat. No. 7,634,883 is a device intended to move exterior water in the form of rain or condensation and drip away from the structure. The patent does not teach or claim the escape of vapor from inside the wall or for the wall to dry, nor is there any allowance for incorporating a defined drainage plane, that is a rainscreen. Further, this device is limited to wood framed and sheathed construction with a stucco finish above and stucco over masonry or block below. The patent does not cover a three coat stucco finish above and below or stucco above and stone below.

Designs currently available only use casing beads, "J' beads, weep screeds and screeds for the mid wall juncture of finish at a floor line or dissimilar materials of a structure or a building. The current art does not facilitate the ventilation of a primary drainage cavity or the drying of the inside of the wall. Some of these areas of concern are at the base of full height walls and step walls, changes in roofline where a vertical element terminates into a non-vertical structure such as a dormer and roof for the removal of vapor from the wall. In areas as noted above where greater rainfall is typical a more defined escape means for vapor and moisture is required over current methods.

Current commercially available accessories for stucco, stone and other finishes do not address these conditions and constraints on air and vapor flow throughout a wall. Therefore a new wall design and trim accessories are necessary to accommodate the different forms and function of the building envelope and prevent premature deterioration of the walls.

SUMMARY OF THE INVENTION

According to one aspect of the invention, a ventilation screed is provided comprising: an upper attachment flange having a top portion and a bottom portion and at least one opening in the top portion; a drip edge protruding from the bottom portion of the upper attachment flange; a drainage cavity protrusion protruding from the bottom portion of the upper attachment flange above the drip edge, wherein the drainage cavity protrusion has an L-shaped drainage trough portion having at least one drainage opening in a bottom portion, an upper ground portion in communication with the L-shaped drainage trough portion and a drainage cavity shroud in communication with the upper ground portion, wherein the drainage cavity shroud extends past the drip edge.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and layouts have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term may be occasionally interchangeably used with its non-hyphenated version, and a capitalized entry may be interchangeably used with its non-capitalized version. Such occasional interchangeable uses shall not be considered inconsistent with each other. It is noted that various figures (including component diagrams) shown and discussed herein are for illustrative purpose only, and are not drawn to scale.

Figure 1:
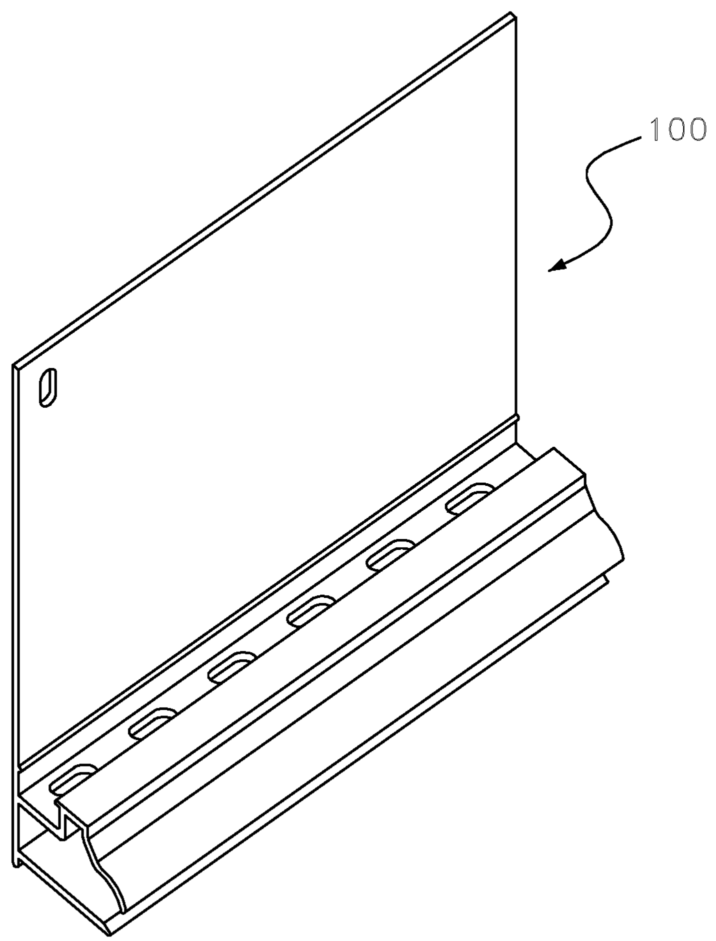
FIG. 1 depicts an isometric view of the present invention.
Figure 2:
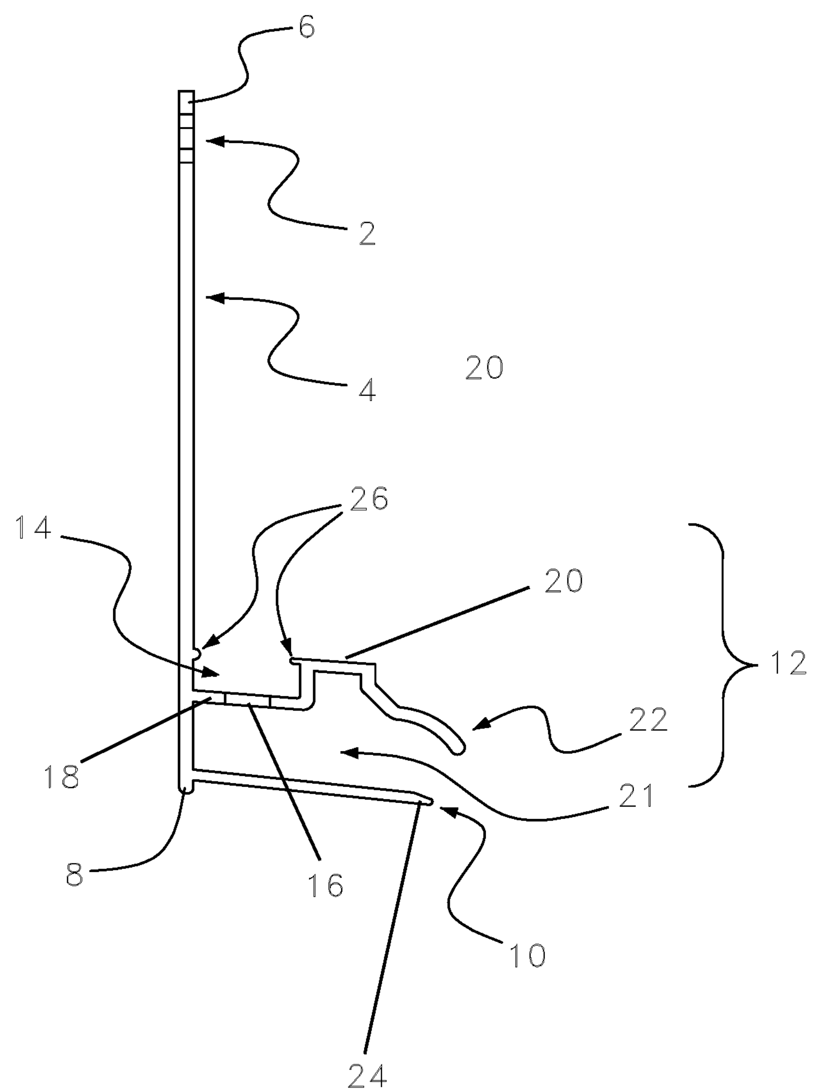
FIG. 2 depicts a side view of the present invention with labeling.
Figure 3:
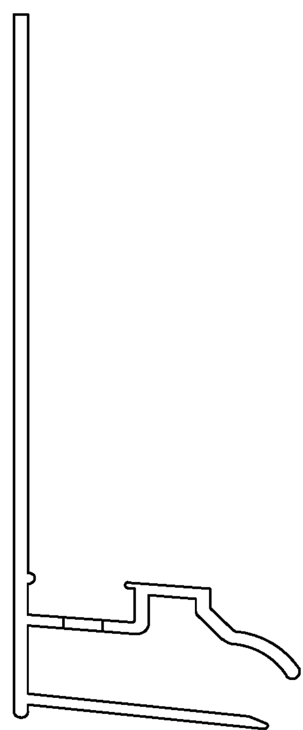
FIG. 3 depicts a side view of the present invention without labels.
Figure 16:
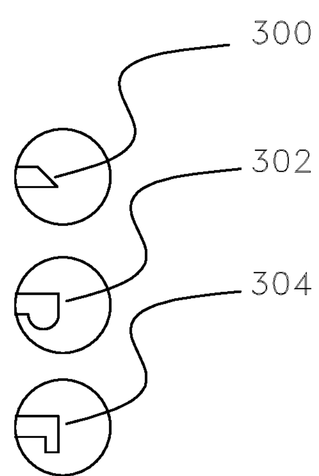
FIG. 16 depicts various drip edges according to the present invention.

FIG. 1 depicts a ventilation screed (100) according to one aspect of the present invention. FIGS. 2 and 3 depict a side view of the ventilation screed having an upper attachment flange (4) having a top portion (6) and a bottom portion (8) and at least one opening (2) in the top portion (6). The term top portion (6) refers to the top half of the upper attachment flange and the term bottom portion (8) refers to the bottom half of the upper attachment flange. There may be a drip edge (10) protruding from the bottom portion (8) of the upper attachment flange (4). There may be a drainage cavity protrusion (12) protruding from the bottom portion (8) of the upper attachment flange (4) above the drip edge (10), wherein the drainage cavity protrusion (12) has an L-shaped drainage trough portion (14) having at least one drainage opening (16) in a bottom portion (18), an upper ground portion (20) in communication with the L-shaped drainage trough portion (14) and a drainage cavity shroud in communication with the upper ground portion, wherein the drainage cavity shroud extends past the drip edge (10). The drip edge (10) is angled downward in a direction away from the upper attachment flange (4) and there is a space (21) between the drainage cavity protrusion (12) and the drip edge (10) such that water is caught in the drainage trough (14) and flows through the drainage openings (16), the space (21) and hits the drip edge (10) which directs it away from the wall. As can be seen in FIG. 2, the drip edge is slightly angled downward at an angle of approximately 95-100 degrees from upper attachment flange (4). The drip edge (10) may have a shaped end (24) selected from the group consisting of angled edge (300), rounded edge (302) and rectangular edge (304) as depicted in FIG. 16. There may be at least one friction bead (26) along a portion of at least one of the upper attachment flange (4), the L-shaped drainage trough portion (14), the drip edge (10) and the drainage cavity (12).

Figure 4:
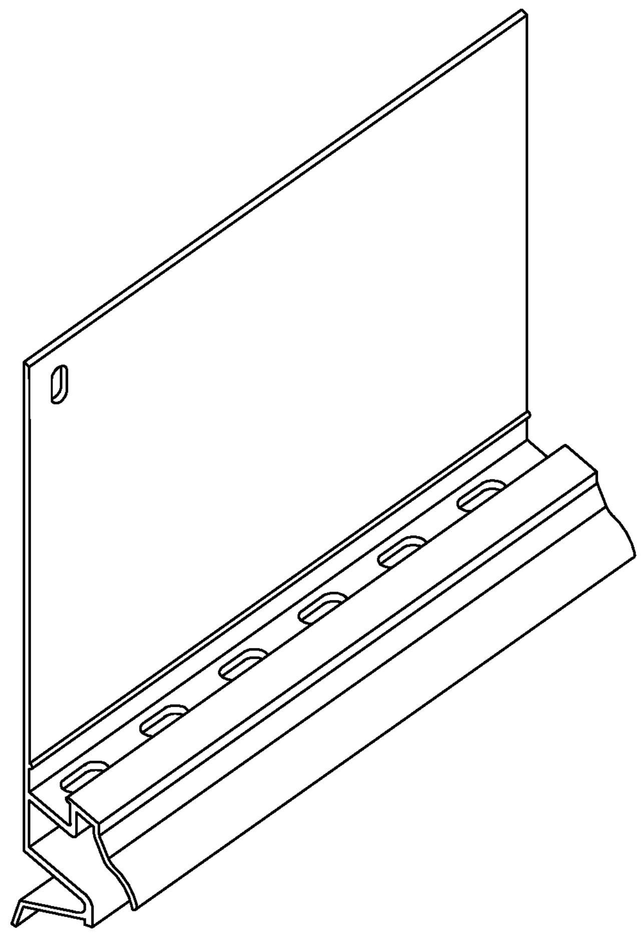
FIG. 4 depicts a side view of the present invention shown with a return leg.
Figure 5:
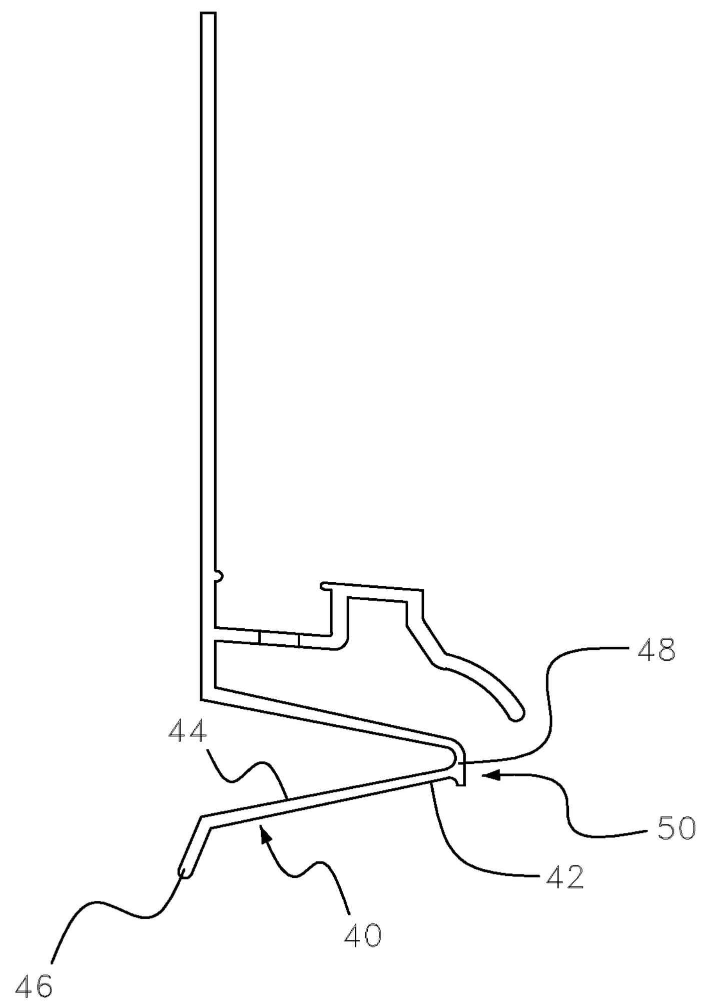
FIG. 5 depicts a side view of the present invention shown with a return leg with labels.
Figure 6:
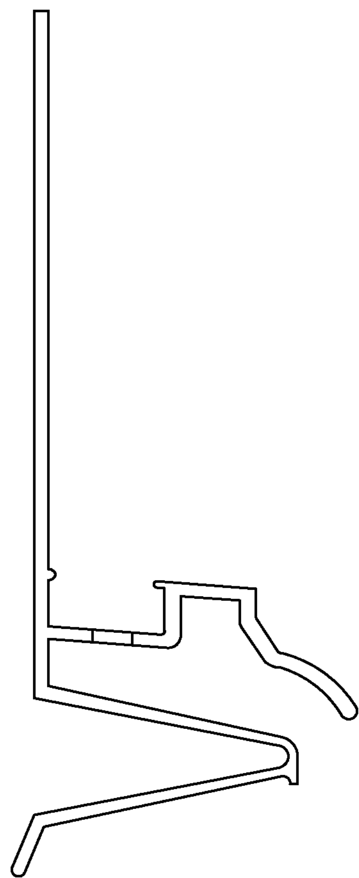
FIG. 6 depicts a side view of the present invention shown with a return leg without labels.
Figure 7:
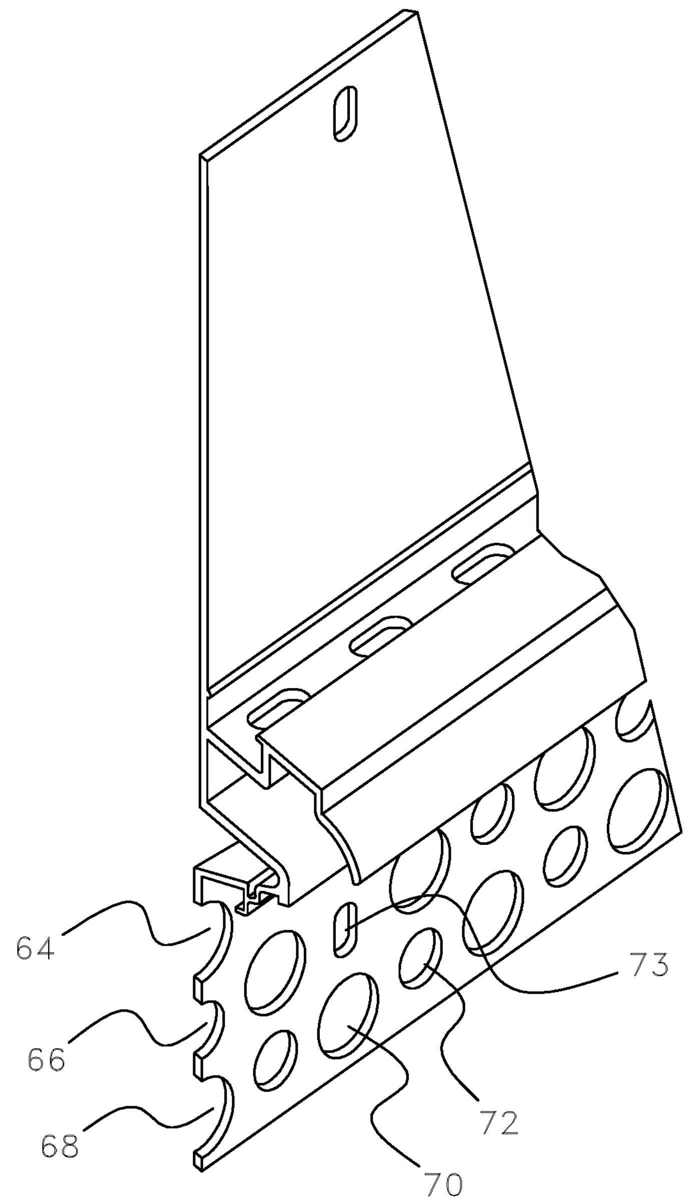
FIG. 7 depicts an isometric view of the present invention with a lower attachment flange.
Figure 8:
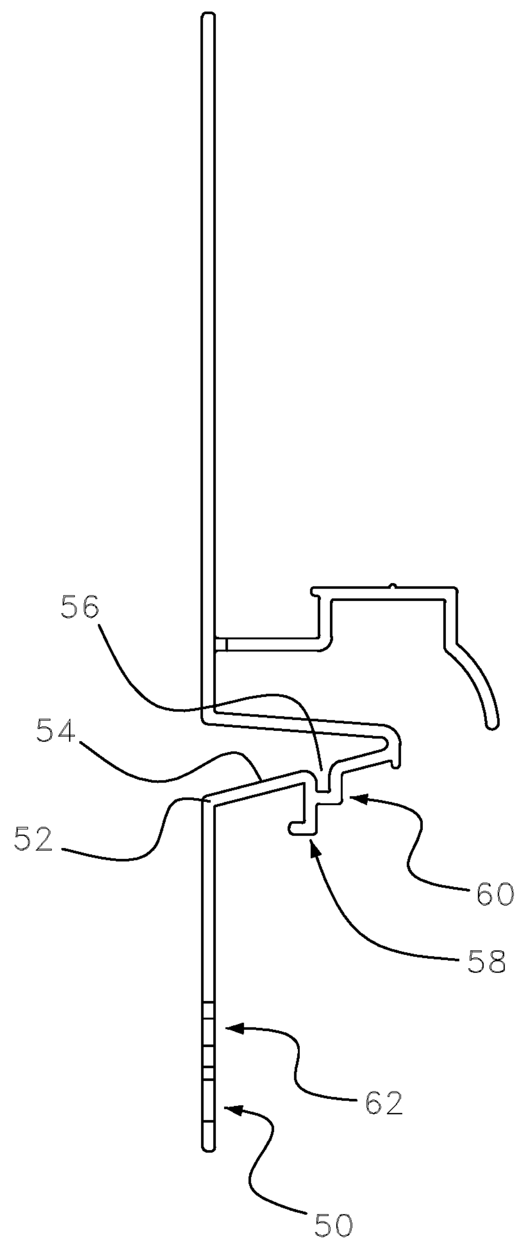
FIG. 8 depicts a side view of the present invention with a lower attachment flange with labeling.

As shown in FIGS. 4, 5 and 6, there may be a return leg (40) having a first end (42), a middle portion (44) and a second end (46). The first end (42) is in communication with a far end (48) of the drip edge (50). The second end (46) may have a downward bend (as depicted in FIG. 5). The return leg (40) slopes downwardly from the first end (42) to the second end (46). The second end (46) is closer to the building to which the ventilation screed is attached than the first end (42).

Figure 11:
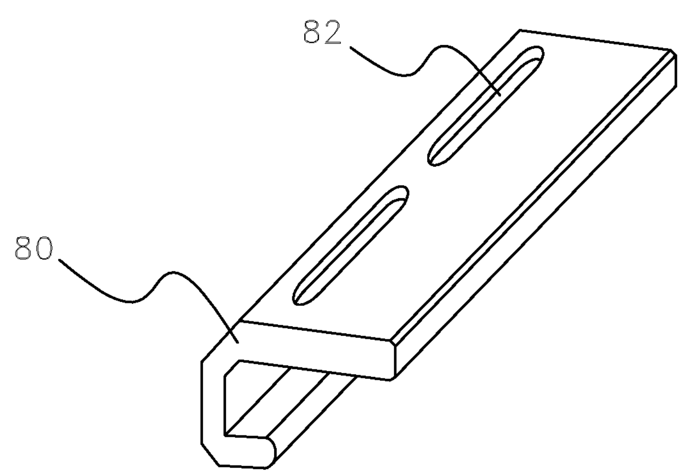
FIG. 11 depicts a connector according to the present invention.
Figure 12:
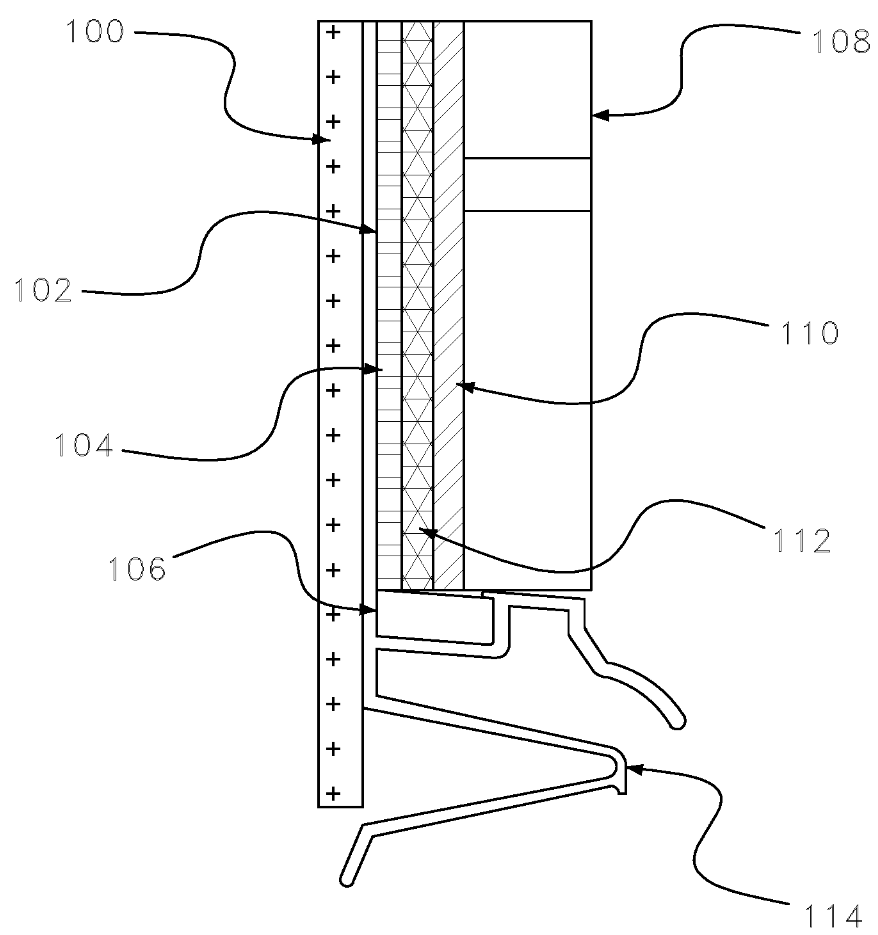
FIGS. 12, 13, 14 and 15 depict the present invention as installed.
Figure 13:
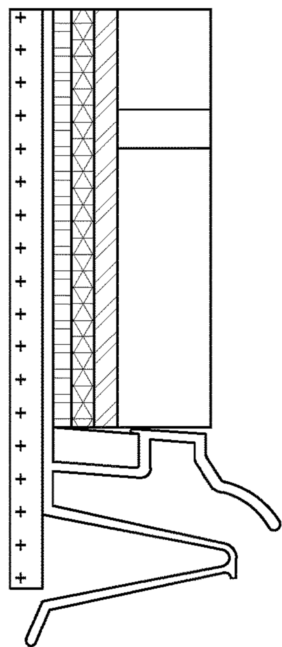
Figure 14:
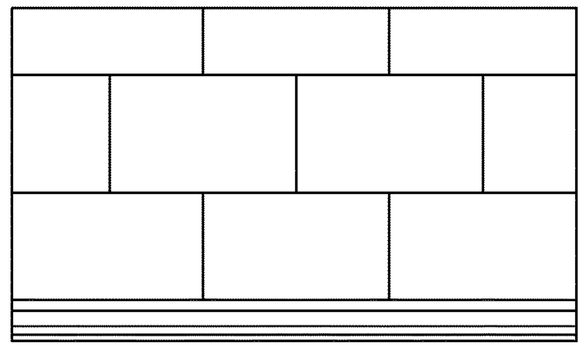
Figure 15:
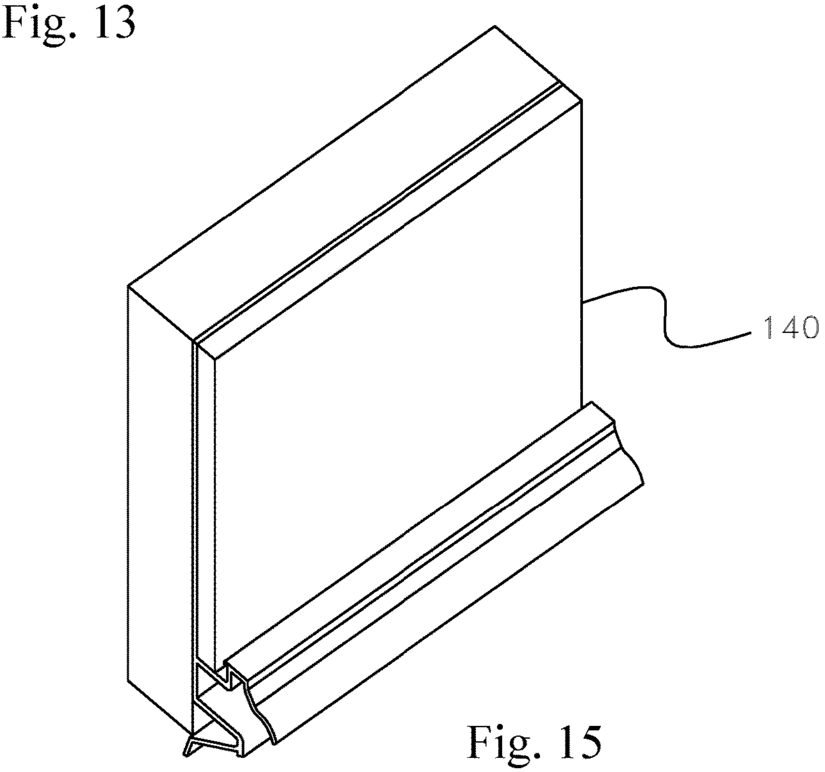

As shown in FIGS. 7, 8, 9 and 10, there may also be a lower attachment flange (50) in communication with the second end (52) of the return leg (54). There may also be a middle portion (56) of the return leg that has two backward L-shaped ground portions (58 and 60). The lower attachment flange (50) may also have at least one opening (62). The lower attachment flange (50) may have at least three rows of circular openings (64, 66 and 68). As shown, the at least three rows of circular openings (64, 66 and 68) have alternating larger openings (70) and smaller openings (72) and each row is offset from the row below it. This is to say that a larger opening (70) of one row is above a smaller opening (72) of another row. There may also be an oval shaped opening (73) in place of the smaller opening (72) for attachment to a wall. Typically a nail or a screw with a head that is larger than the oval shaped opening is used to attached the apparatus to a wall portion. FIG. 11 depicts a connector (80) between two adjacent ventilation screeds (100). As installed there may multiple ventilation screeds lined up next to each other and a connector (80) may sit in the space (21) between two adjacent ventilation screeds to facilitate straight, true and continuous installation of the invention. By way of example, the connector (80) may be one half in the space (21) of a first ventilation screed and the other half in the space (21) of a second ventilation screen. In this way, the connector (80) lines up two adjacent ventilation screeds. The connector (80) may be a three sided connector that is smaller than and sits in the space between the drainage cavity protrusion and the drip edge and has openings (82) that align with the at least one drainage opening (16) in a bottom portion of the drainage cavity protrusion.

Figures 9, 10:
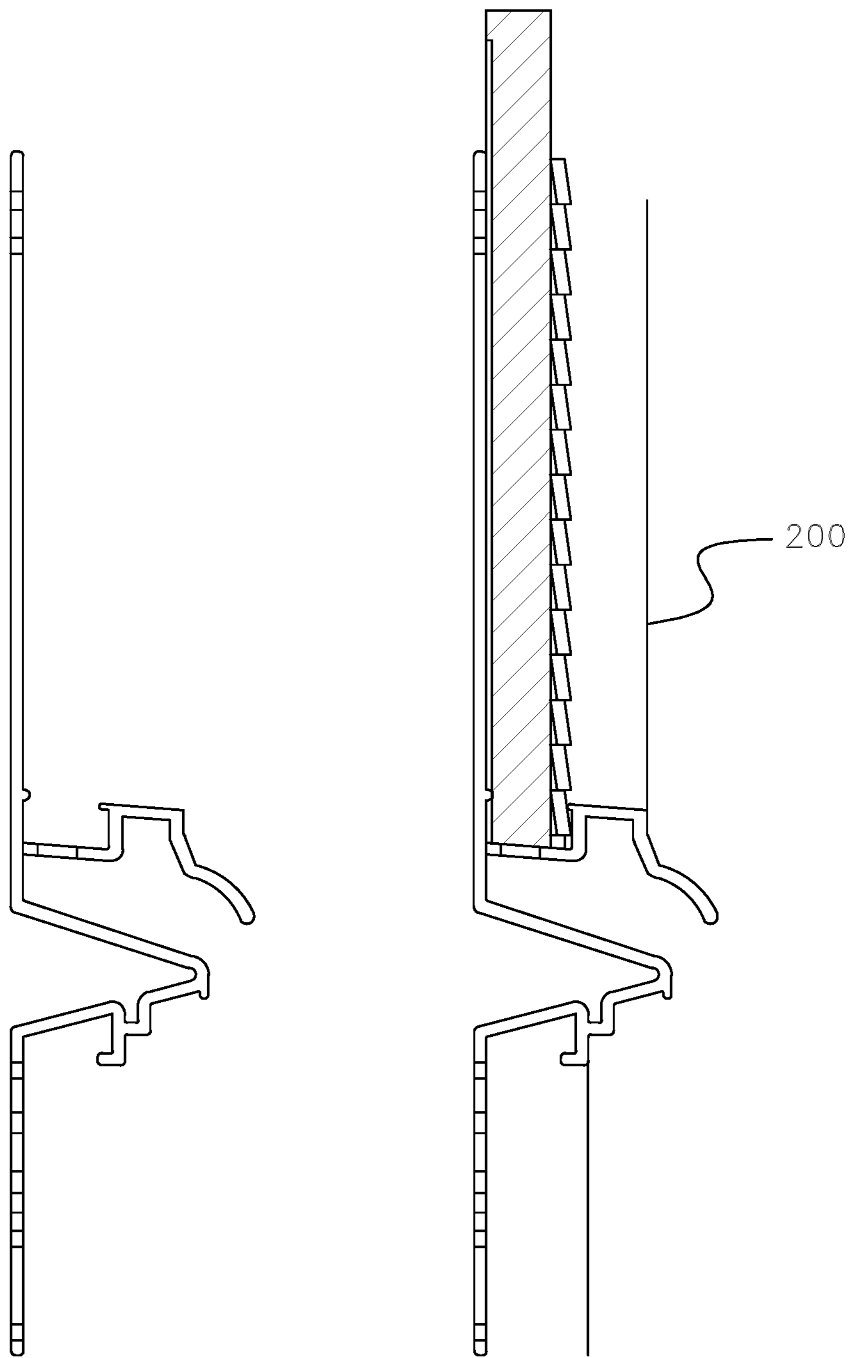
FIG. 9 depicts a side view of the present invention according to one embodiment.
FIG. 10 depicts a side view of the present invention according to one embodiment.
Figure 17:
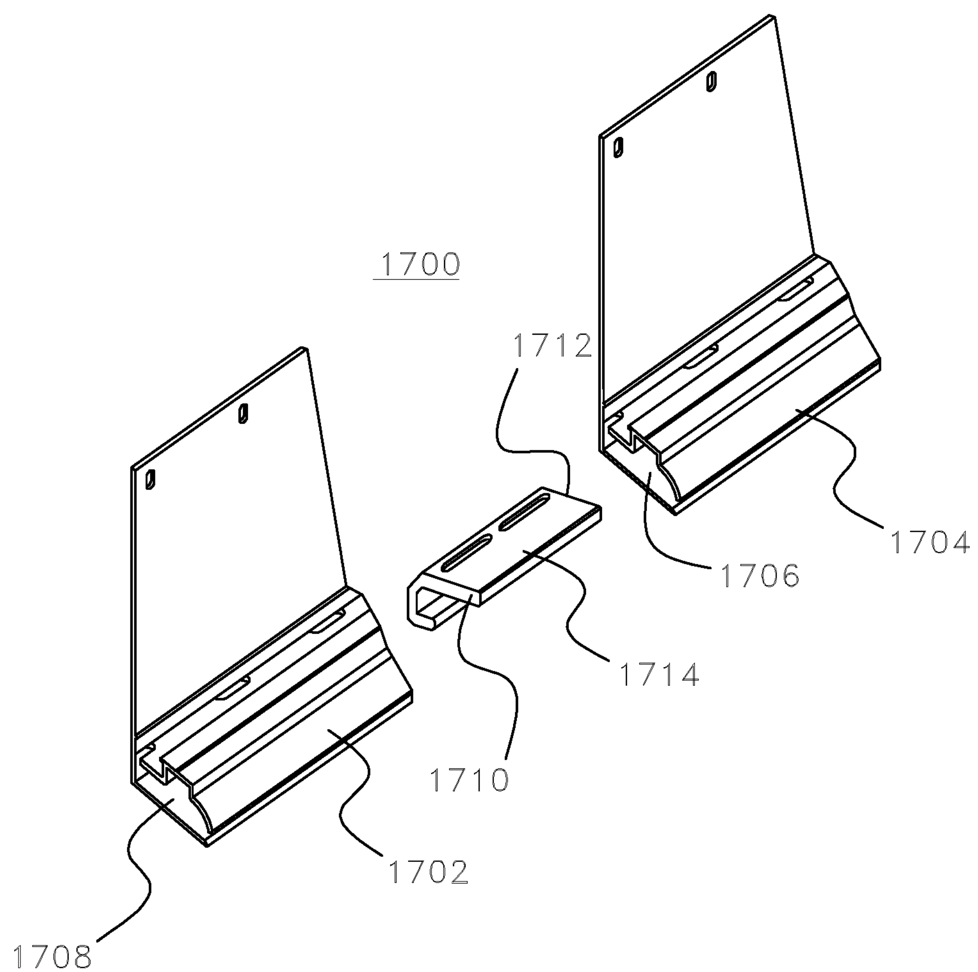
FIG. 17 depicts a joint connector.

FIGS. 12, 13, 14 and 15 depicts the ventilation screed as it would be typically installed. As shown, the building may have sheathing (100), with building wrap (102), grade D paper (104), there may be an insect screen (106) in the L-shaped drainage trough portion (depicted in FIG. 2 as 14). The insect screen (106) could be reticulated foam, it could be an unwoven polymer such as cellulose, nylon or spun polypropylene fiber, or it could be even a nylon or polypropylene screen, although that would be less durable. There may be "Green Screen™" or another rain screen or solid or corrugated furring strips (112) to the right of the ventilation screed (114), then lath (110) and brick or stone veneer (108). The "Green Screen™", or another rain screen or solid or corrugated furring strips (112) may be installed parallel to and between siding and the upper attachment flange portion. There may also be a screen (140) vertical and perpendicular to at least a portion of the perforated attachment flange portion. There may also, or alternatively, be a mesh vertical and perpendicular to at least a portion of the perforated attachment flange portion. There may also be reticulated foam (which may be in the same location as the rain screen or solid or corrugated furring strips (112)) to the right of the ventilation screed (114), then lath (110) and brick or stone veneer (108). The reticulated foam insert may be installed parallel to and between siding and the upper attachment flange portion. The term "greenscreen" refers to a polypropylene entangled mesh, but it could also be described as a polymer strand matrix with a dimple structure. The Greenscreen™ provides a drainage path and ventilation for moisture between the exterior wall finish and sheathing. It is a polymer strand matrix with a unique dimple design that exhibits superior compressive strength. When installed according to the present invention is allows over 99% of moisture and vapor to drain and escape from the wall. There may also be a screen (140) parallel to at least a portion of the perforated attachment flange portion. There may also, or alternatively, be a mesh parallel to at least a portion of the perforated attachment flange portion. There may also be a joint connector, as shown in FIG. 17. As depicted, the joint connector connects a first ventilation screed (1702) and a second ventilation screed (1704). The joint connector (1714) has a left side (1710) and right side (1712). The left side (1710) would sit in a drainage cavity (1708) of the first ventilation screed (1702) and the right side (1712) would sit in a drainage cavity (1706) of the second ventilation screed (1704). FIG. 17 depicts the joint connector in an unattached position to depict the parts. As shown in FIG. 10, there may also be a planar vertical element (200) extending from the upper ground portion (20), wherein the planar vertical element (200) is substantially parallel to the upper attachment flange.

The present invention overcome the problems presented above and other problems relative to the escape of vapor and moisture from a wall, at locations below the top of the wall, as will be apparent to those skilled in the art of building cladding. As vapor is accumulated within a wall the flow of vapor can move by gravity or convection created by temperature, pressure or intrusion from outside the wall system. As temperature causes vapor to condense and move down the wall or pressure, moves the vapor to a lower pressure area, this invention allows the moisture and vapor to escape at the invention's provided wall outlets. The present invention have common design elements above the surface adjacent to the lower surface of the drainage cavity. According to one of the embodiments an attachment flange with openings for nailing or other attachment means is provided. According to another embodiment this invention incorporates a primary drainage plane that will be installed on top of the attachment flange to continue an unobstructed movement of vapor and moisture. According to the present invention a drainage trough is located at the base of the attachment flange. The drainage trough provides a location for the rainscreen to seat. The trough is perforated with drainage openings to continue the unobstructed movement of vapor and moisture. According to present invention the trough with slotted openings provides the transition to the drainage cavity where vapor and moisture then passes to the exterior of the wall. According to the present embodiment a longitudinal edge acts as a screed in determining and helping to maintain a consistent thickness of finish. According to the present invention a shaped lip extends beyond the screed edge acting as a shroud to help prevent wind or pressure driven water from entering the walls of the building or structure. By introducing a primary drainage plane, vapor can escape from above by following the rainscreen down the outer surface of the attachment flange, through drainage trough, entering the drainage cavity and escape the wall further allowing the wall to dry. Embodiments of this invention can be incorporated into new construction or the remediation of worn or deficient walls of stucco, manufactured stone or systems utilizing continuous rigid thermal insulation.

The substantially solid upper attachment flange with multiple attachment Openings is typically a planar surface that is attached to a vertical building wall. Attachment of the upper attachment flange is achieved with one of more nails, screws, other mechanical fasteners or adhesive. This upper attachment flange acts as a vapor barrier that can utilize rainscreen and or Water Resistant Barrier, WRB, positioned on top of this flange. Vapor can move through heat exchange or gravity. The present invention provides a moisture removal assembly including drainage trough with friction beads and drainage openings that allow for vapor to follow the primary drainage plane into the drainage cavity and vapor to exit the wall between the drainage cavity shroud and drip edge. The friction beads provides an optional rainscreen with a snug fit with in the drainage trough. A plurality of sized and shaped openings in the base of the drainage trough allow vapor to easily pass to the drainage cavity. The lower surface of the drainage cavity is sloped and ending with a drip Edge to facilitate the escape of vapor in whatever form may exist. The device according to the present invention can terminate stucco at the base of a full height wall, base of a step wall, a change in roofline where a vertical element terminates into a non-vertical structure such as a dormer and roof for the removal of vapor from the wall, the header of a window or door or any other through wall penetration.

A device according to the present invention can terminate stucco at the base of a full height wall, base of a step wall, a change in roofline where a vertical element terminates into a non-vertical structure such as a dormer and roof for the removal of vapor from the wall. The lower surface of the Drainage Cavity is sloped ending at a formed Drip Edge all facilitating the outward movement of vapor in any form that may exist. The ventilation screed according to the present invention can terminate one finish at any location in a wall and start the same or new finish as design or need for vapor removal is desired. This embodiment of the device permits wall ventilation and escape of moisture where there is a break in the finish materials such as transitioning from one finish to another such as from stucco to thin veneer stone or continuous rigid thermal insulation or at the floor breaks on multi-story buildings. FIG. 11 depicts a “connector” accessory to facilitate the straight, true and continuous installation of various embodiments of this invention. An optional predefined drip edge can be incorporated. The lower surface of the drainage cavity forms this drip edge. The surface is sloped to facilitate the escape of vapor in whatever form that exists. According to the embodiment depicted in FIG. 8, the ½" ground is intended for the application of direct applied stucco to masonry or CMU. The ⅝" ground for two-coat stucco finishes and ⅞" for full thickness 3-coat stucco finishes. Beyond the aforementioned grounds this device can accommodate additional thicknesses of finish not limited to veneer stone, manufactured brick, metal panels, cement panels, all with or without incorporating rigid insulation. The Lower Attachment Flange can be either non-perforated or with a plurality of shapes and sized openings to accommodate cementitious or acrylic finishes. The precise dimensions of the wall ventilation devices according to various embodiments of the present invention may vary from application to application as will be apparent to one of ordinary skill in the art.

Figure 18:
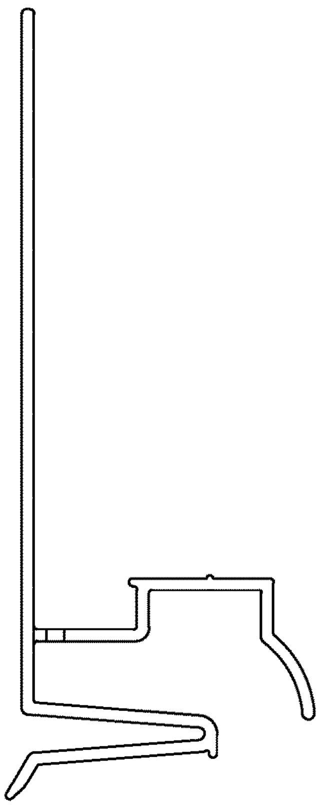
FIGS. 18, 19, 20, 21, 22A, 22B 23, 24, 25, 26, 27, 28, 29 and 30 depict the present invention.
Figure 19:
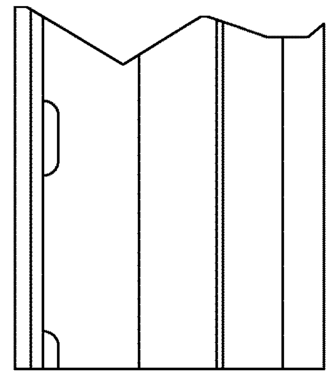
Figure 20:
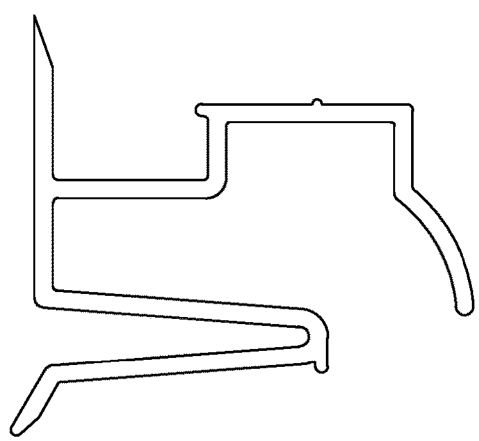
Figure 21:
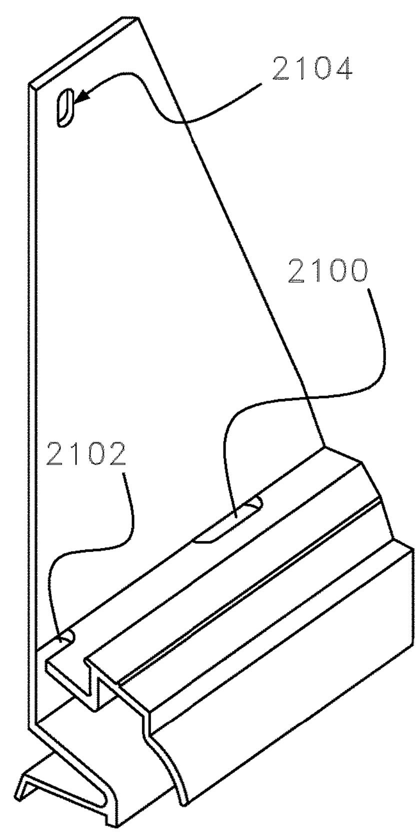
Figure 22A:
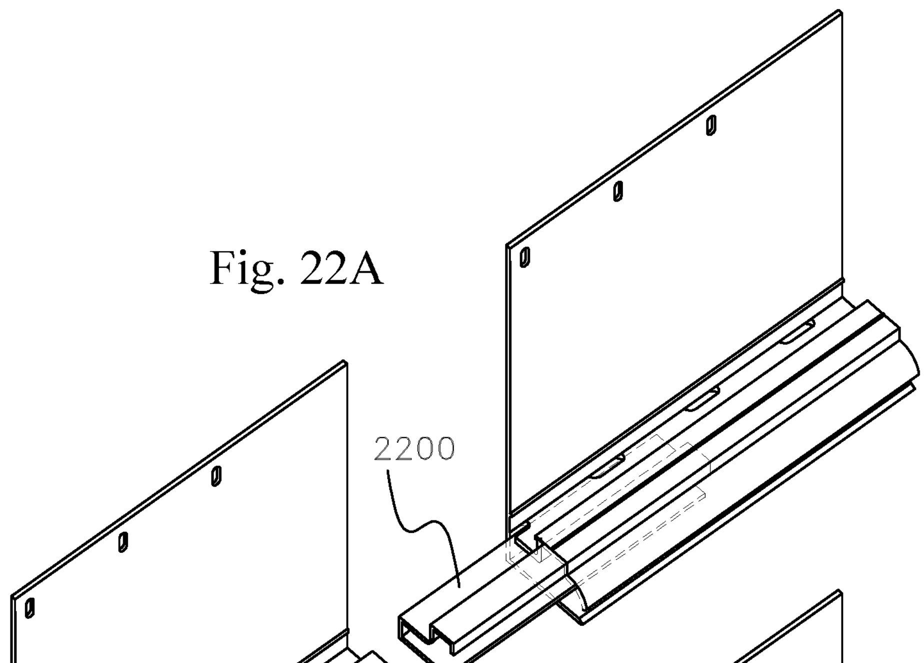
Figure 22B:
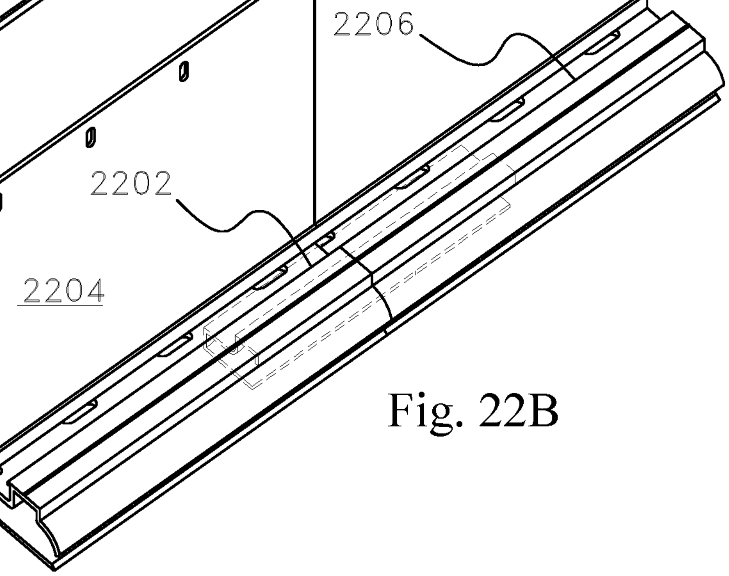
Figure 23:
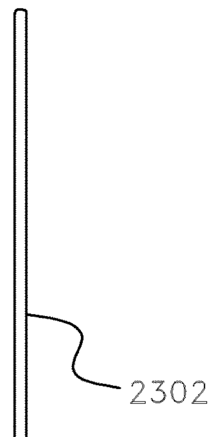
Figure 24:
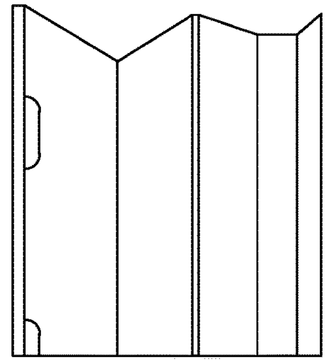
Figure 25:
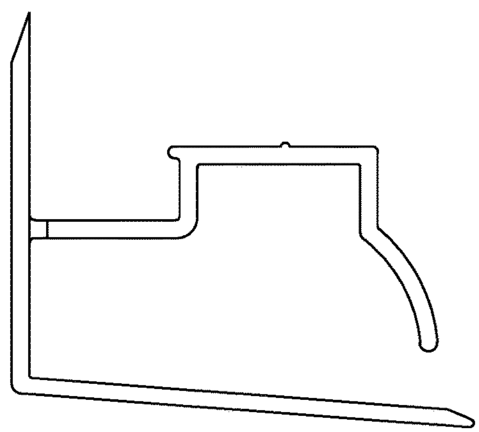
Figure 26:
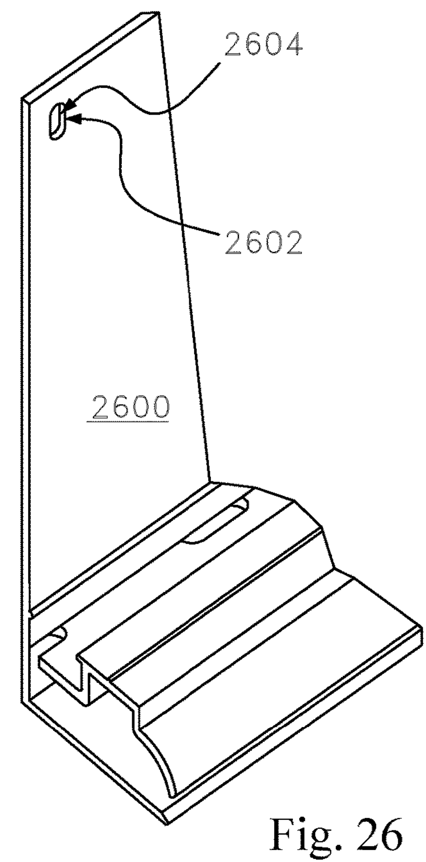
Figure 30:
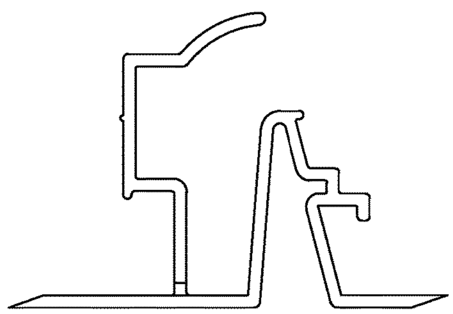
Figure 28:
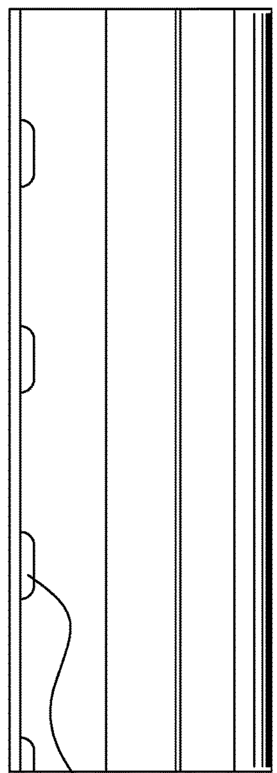
Figure 29:
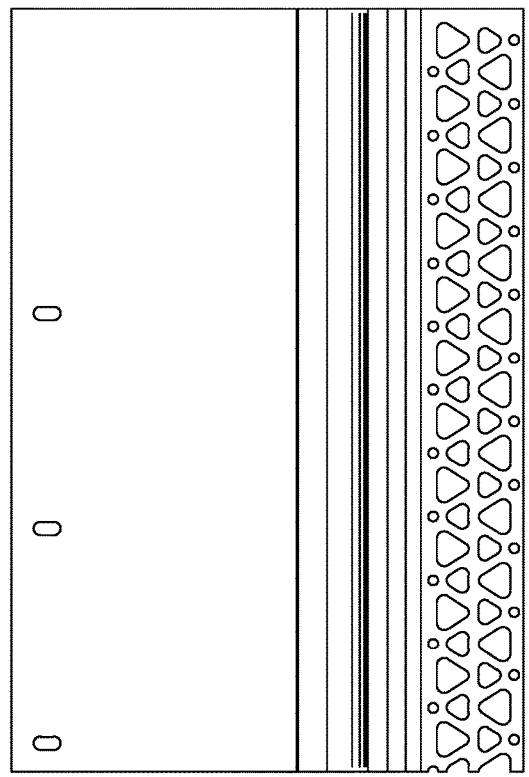
Figure 27:
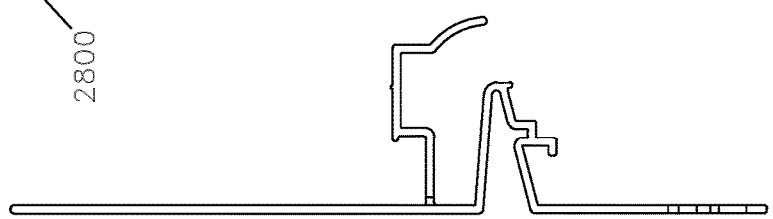

As shown in FIGS. 18-20, the drainage cavity protrusion has an L-shaped drainage trough portion having at least one drainage opening (2100 and 2102) in a bottom portion. In this embodiment the drainage opening is located where the drainage cavity protrusion meets the upper attachment flange and the opening may be shaped as a rectangle with rounded corners or a portion of a rectangle with rounded corners. In the prior embodiments, the drainage opening was in a middle portion of the L-shaped drainage trough portion. FIGS. 22A and 22B depicts a joint connector (2200) between two adjacent ventilation screeds. As can be seen, when installed a left portion (2202) of the joint connector (2200) sits in a first ventilation screed (2204) and a right portion (2206) of the joint connector sits in a second ventilation screed (2208) and the second ventilation screed (2208) is adjacent to the first ventilation screed (2204).

FIGS. 23, 24, 25 and 26 depict that the drip edge (2300) is angled downward in a direction away from the upper attachment flange (2302).

FIGS. 27, 28, 29 and 30 depict that in the embodiment with a lower attachment flange the drainage cavity (2800) can be similar to those depicted in FIG. 18-20 (where the drainage cavity protrusion meets the upper attachment flange).

As the invention has been described, it will be apparent to those skilled in the art that the same may be varied in many ways without departing from the spirit and scope of the invention. Any and all such modifications are intended to be included within the scope of the appended claims.

In the preceding description, for purposes of explanation and not limitation, specific details are set forth (such as particular structures, components, techniques, etc.) in order to provide a thorough understanding of the disclosed fencing system. However, it will be apparent to those skilled in the art that the disclosed system may be constructed in other embodiments that depart from these specific details. That is, those skilled in the art will be able to devise various arrangements which, although not explicitly described or shown herein, embody the principles of the disclosed system. In some instances, detailed descriptions of well-known components and construction methods are omitted so as not to obscure the description of the disclosed system with unnecessary detail. All statements herein reciting principles, aspects, and embodiments of the disclosed system, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A ventilation screed comprising:

an upper attachment flange having a top portion and a bottom portion and at least one opening in the top portion;

a drip edge protruding from the bottom portion of the upper attachment flange;

a drainage cavity protrusion protruding from the bottom portion of the upper attachment flange above the drip edge, wherein the drainage cavity protrusion has an L-shaped drainage trough portion having at least one drainage opening in a bottom portion and a substantially vertical portion with a top end and a bottom end in communication with the bottom portion, an upper ground portion in communication with the top end of the substantially vertical portion of the L-shaped drainage trough portion extending outward from the vertical portion and being substantially perpendicular to the substantially vertical portion and a drainage cavity shroud extending substantially downward from the upper ground portion, wherein the drainage cavity shroud extends past the drip edge.

2. A ventilation screed as in claim 1, wherein the drip edge is angled downward in a direction away from the upper attachment flange.

3. A ventilation screed as in claim 1, wherein the drip edge has a shaped end selected from the group consisting of angled edge, rounded edge and rectangular edge.

4. A ventilation screed as in claim 1, further comprising at least one rounded edge friction bead along a portion of at least one of the upper attachment flange, the L-shaped drainage trough portion, the drip edge and the drainage cavity.

5. A ventilation screed as in claim 1, further comprising a return leg having a first end, a middle portion and a second end, wherein the first end is in communication with a far end of the drip edge.

6. A ventilation screed as in claim 5, wherein the second end has a downward bend.

7. A ventilation screed as in claim 5, wherein the return leg slopes downwardly from the first end to the second end.

8. A ventilation screed as in claim 5, further comprising a lower attachment flange in communication with the second end of the return leg.

9. A ventilation screed as in claim 5, wherein the middle portion of the return leg has two backward L-shaped ground portions.

10. A ventilation screed as in claim 8, wherein the lower attachment flange has at least one opening.

11. A ventilation screed as in claim 10, wherein the lower attachment flange has at least three rows of circular openings.

12. A ventilation screed as in claim 1, further comprising a connector between two adjacent ventilation screeds.

13. A ventilation screed as in claim 12, wherein the connector is a three sided connector that is smaller than and sits in a space between the drainage cavity protrusion and the drip edge and has openings that align with the at least one drainage opening in a bottom portion of the drainage cavity protrusion.

14. A ventilation screed as in claim 1, further comprising a screen parallel to at least a portion of the upper attachment flange.

15. A ventilation screed as in claim 1, further comprising a mesh parallel to at least a portion of the upper attachment flange.

16. A ventilation screed as in claim 1, further comprising a reticulated foam insert that installed is parallel to and between siding and the upper attachment flange portion.

17. A ventilation screed as in claim 16, further comprising a joint connector, wherein a left portion of the joint connector sits in a first ventilation screed and a right portion of the joint connector sits in a second ventilation screed and the second ventilation screed is adjacent to the first ventilation screed.

18. A ventilation screed as in claim 11, the at least three rows of circular openings each having alternating larger openings and smaller openings and each row is offset from the row below it.

19. A ventilation screed as in claim 1, further comprising a planar vertical element extending from the upper ground portion, wherein the planar vertical element is substantially parallel to the upper attachment flange.

20. A ventilation screed as in claim 1, further comprising an insect screen in the L-shaped drainage trough portion.

21. A ventilation screed as in claim 1, wherein the drainage opening is located where the drainage cavity protrusion meets the upper attachment flange.

* * * * *